United States Patent [19]

Willafys et al.

[11] Patent Number: 5,436,855
[45] Date of Patent: Jul. 25, 1995

[54] METHOD OF SIMULATING AN INDUSTRIAL PROCESS, AND USE THEREOF FOR TESTING THE OPERATION OF A CONTROLLER

[75] Inventors: Didier Willafys, Cambrai; Abdallah Asse, Valenciennes, both of France

[73] Assignee: Prosyst S.A., France

[21] Appl. No.: 7,058

[22] Filed: Jan. 21, 1993

[30] Foreign Application Priority Data

Jan. 24, 1992 [FR] France .................. 92 01137

[51] Int. Cl.⁶ .......................................... G06F 15/60
[52] U.S. Cl. ............................................... 364/578
[58] Field of Search ............. 364/578, 149, 158, 159, 364/500, 502, 801; 340/515, 516

[56] References Cited

U.S. PATENT DOCUMENTS

| | | | |
|---|---|---|---|
| 3,671,725 | 6/1972 | Bakke | 364/159 |
| 3,786,242 | 1/1974 | Brooks | 364/159 |
| 4,616,308 | 10/1986 | Morshedi et al. | 364/159 |
| 4,796,194 | 1/1989 | Atherton | 364/578 |
| 4,862,345 | 8/1989 | Lekron | 364/188 |
| 5,079,731 | 1/1992 | Miller et al. | 364/578 |
| 5,303,170 | 4/1994 | Valko | 364/578 |

OTHER PUBLICATIONS

Chen; "Linear System Theory and Design"; Holt, Rinehart and Winston (1984).
D. Connor, "Analog Simulation", Nov. 24, 1988, ED-N–Electrical Design News, vol. 33, No. 24, pp. 106–116.
M. Holder "Testen ohne einzubauen", Nov. 19, 1990, Elektrotechnick, vol. 72, No. 11, pp. 26–33.

*Primary Examiner*—Ellis B. Ramirez
*Attorney, Agent, or Firm*—Ladas & Parry

[57] ABSTRACT

An industrial process (2) is simulated in which the value of each physical magnitude $P_i$ characteristic of its state is varied at a rate of change $V_i$ that is a function of the state of control signals (3) emitted by an automatic controller (1), and which reports its state to said controller by means of state signals (4) which are emitted by sensors as a function of the values of the respective physical magnitudes that they monitor. For each physical magnitude $P_i$, the time interval $\delta t_i$ is determined during which the value of the physical magnitude can change without any of the sensors monitoring said physical magnitude $P_i$ changing state. Thereafter the value of each of the physical magnitudes $P_i$ is updated by incrementing its value by the product of the corresponding rate of change $V_i$ multiplied by the smallest of the above-determined time intervals $\delta t$. Finally, after updating the sensors monitoring each of the physical magnitudes $P_i$, a parameterizable length of time is allowed to elapse before repeating the method. The simulation method is used for testing the logical operation and the timing of a controller, such as an industrial programmable controller.

6 Claims, 4 Drawing Sheets

METHOD OF SIMULATING AN INDUSTRIAL PROCESS, AND USE THEREOF FOR TESTING THE OPERATION OF A CONTROLLER

The present invention relates mainly to a method of simulating an industrial process controlled by an automatic controller. The increasing complexity of processes implemented in present industrial installations requires increasing complexity of the automatic controllers that control them.

BACKGROUND OF THE INVENTION

Thus, in order to avoid major debugging costs on site, it has become essential, prior to putting an industrial installation into operation under the control of an automatic controller, to test the controller for proper operation, regardless of whether it is implemented as hardwired logic, or as programmed logic of the industrial programmable controller type.

A known method of testing the validity of an automatic controller consists in connecting said controller to a simulator which accurately reproduces the process of the industrial installation, such that the inputs of one are in communication with the outputs of the other, and vice versa.

The process simulation method used by such simulators, which are usually systems based on computer means, consists in handling time delays which are triggered on the simulator receiving a command emitted by the controller. Each time a time delay comes to an end, which corresponds in reality to a sensor in the industrial installation changing state, the simulator informs the controller about the state of the process. The industrial process is thus simulated in real time.

The major drawback of such a simulation method lies in the time wasted while waiting for a time delay to come to its end: the slower the simulated process, the greater the amount of time wasted.

The main object of the present invention is thus to provide a method of simulating a process, which method can be implemented automatically, and eliminates such time wasting, while nevertheless taking account of the real time in which the process takes place.

SUMMARY OF THE INVENTION

This object is achieved by a simulation method for simulating an industrial process that causes the value of each physical magnitude characteristic of the state thereof to vary as a function of the state of control signals emitted by an automatic controller, and that reports its state to said controller by means of state signals emitted by sensors as a function of the values of the respective physical magnitudes that they monitor, wherein the method comprises the following steps:

a) defining a functional model of process monitoring for the industrial process;

b) defining a functional model of process control;

c) initializing the industrial process;

d) calculating for each physical magnitude $P_i$, a rate of change $V_i$ which is a function of the state of the control signals;

e) determining for each physical magnitude $P_i$ whose rate of change is not zero, the time interval $\delta t_i$ during which the value of the physical magnitude can vary without any of the sensors monitoring said magnitude $P_i$ changing state;

f) calculating the time interval $\delta t$ which is defined as the shortest of the time intervals $\delta t_i$ determined in the preceding step;

g) updating the value of each of the physical magnitudes $P_i$, incrementing each of them with the value of the product of the time interval $\delta t$ multiplied by the corresponding rate of change $V_i$;

h) determining, as a function of the values of the physical magnitudes updated in the preceding step, which sensors change state, and updating the corresponding state signals; and i) waiting for a time lapse referred to as the waiting time, the value of which is parameterizable, prior to repeating the method from step d).

A first particular implementation of the simulation method consists in splitting up above-mentioned step a) into the following sequence of steps:

j) defining which sensors monitor each physical magnitude;

jj) associating each sensor with a state signal;

jjj) splitting up the range over which each physical magnitude $P_i$ can vary into a succession of contiguous sectors, each sector $S_{i,j}$ corresponding to a range of the physical magnitude $P_i$ during which none of the sensors monitoring the magnitude $P_i$ changes state; and jjjj) associating each of the sectors $S_{i,j}$ with a bottom limit and a top limit, and also with the corresponding states of the sensors monitoring the magnitude $P_i$.

A second particular implementation of the simulation method consists in splitting up above-mentioned step b) into the following sequence of steps:

j) associating each physical magnitude $P_i$ with the control signals that cause the value of the magnitude $P_i$ to vary;

jj) associating each of the control signals defined in j) with a rate of change for the magnitude $P_i$ as a function of the binary state of said control signal.

More particularly, on the basis of the above two particular implementations, it is possible for steps c) to i) of the simulation method to be performed automatically using the following sequence of steps:

1) selecting a value for the waiting time;

2) selecting for each physical magnitude $P_i$ a current sector $S_i$ selected from the sectors that make up the range of variation in the magnitude $P_i$, and initializing a value $p_i$ lying within the limits of the current sector $S_i$;

3) calculating the rate of change $V_i$ for each physical magnitude $P_i$ on the basis of the rates of change associated in step b(jj) with each control signal as a function of its state;

4) determining, for each physical magnitude $P_i$, the time interval $\delta t_i$ as a function of the limits of the current sector $S_i$, of the rate of change $V_i$, and of the value $p_i$ of the physical magnitude;

5) calculating $\delta t$ in compliance with step f);

6) updating the value of each physical magnitude $P_i$ in compliance with step g);

7) calculating for each physical magnitude for which a time interval $\delta t_i$ equal to $\delta t$ has been determined, a new current sector as a function of the sign of the corresponding rate of change $V_i$;

8) determining which sensors monitoring a physical magnitude $P_i$ for which a new current sector was calculated in the preceding step, has a state in the new current sector that is different from the state it had in the preceding current sector;

9) updating the state signals corresponding to the sensors whose states are calculated as changing in the preceding step; and 10) starting a time delay whose initial value corresponds to the waiting time selected in step 1), and waiting until the end of said time delay before automatically restarting the method at step 3).

Finally, the present invention also provides an application of the simulation method enabling the operation of an automatic controller that controls an industrial process to be tested, whereby the following steps are implemented:

A) initially simulating the entire industrial process with a waiting time that is greater than the estimated execution time of the automatic controller so as to validate the logical sequencing of the control signals emitted by said controller; and B) reiterating the simulation with smaller and smaller waiting times until a minimum waiting time is reached for which the automatic controller still sequences the control signals correctly.

The simulation method may be applied to an automatic controller constituted by an industrial programmable controller. Under such circumstances, the value of the waiting time in step A is chosen so as to be greater than the cycle time of the controller.

BRIEF DESCRIPTION OF THE DRAWINGS

Implementations of the invention are described by way of example with reference to the accompanying drawings, in which.

MORE DETAILED DESCRIPTION

Figure 1:
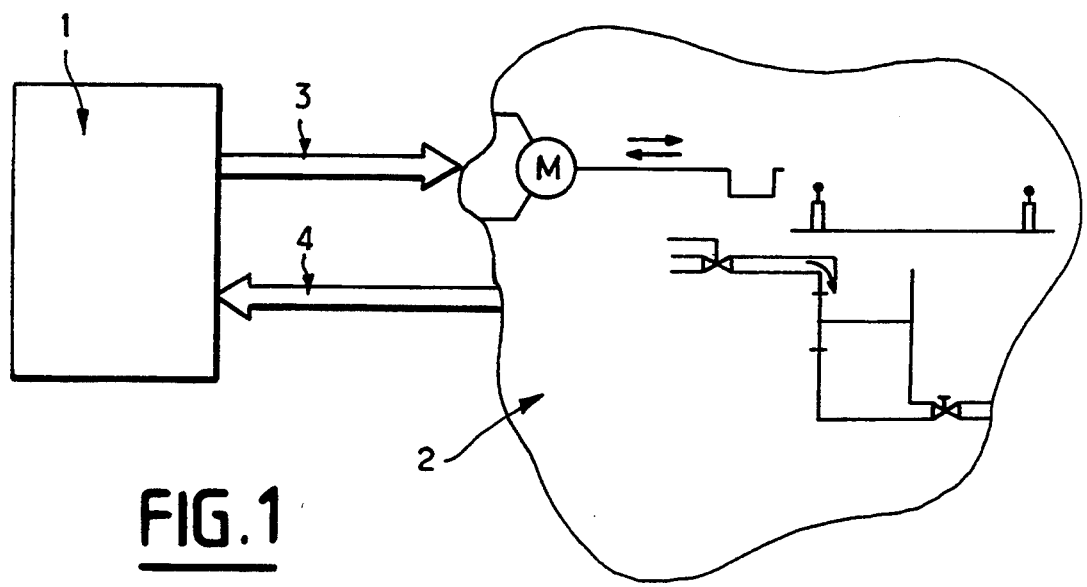
FIG. 1 represents an industrial process that receives control signals emitted by an automatic controller and that replies by emitting state signals.

With reference to FIG. 1, it can be seen that the method of the invention seeks to simulate an industrial process 2 which responds to control signals 3 emitted by an automatic controller 1 by causing physical magnitudes characteristic of its state to vary, and which reports on its state to said controller by means of state signals 4.

A device for implementing the method of the invention is a computer system whose inputs are connected to the outputs of the automatic controller, and vice versa. Such a device is already known and is not described in greater detail. The automatic controller 1 may be implemented in the form of hard-wired logic or in the form of programmed logic of the industrial programmable controller type. This automatic controller may also be a computer system simulating the operating logic of an industrial programmable controller or of a control box containing relays.

The physical magnitudes characteristic of an industrial process are very varied in kind. Examples that may be mentioned, without being limiting in any way, include: the position of a mechanical shaft; the level of liquid in a tank; the temperature in an oven; the pressure in a hermetically sealed chamber; a length of time implemented by a time delay, for example; the speed of rotation of a motor; or finally the weight of an object.

Figure 2:
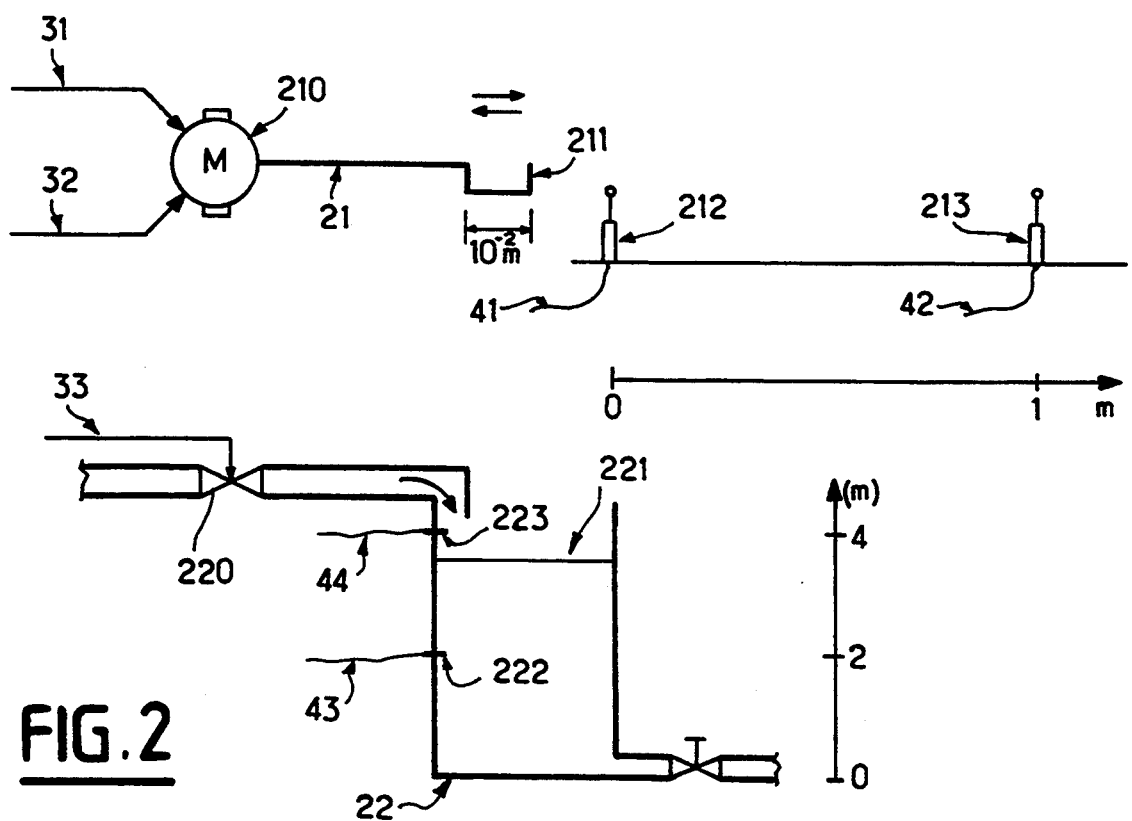
FIG. 2 represents a particular industrial process implemented in an industrial installation that includes a tank and a mechanical shaft.

FIG. 2 represents a particular industrial process implemented in a simple industrial installation, and comprising: a mechanical shaft 21 driven by a motor 210, and a tank 22 which is filled by opening a valve 220. The physical magnitudes characteristic of the state of this process are the position of the mechanical shaft 21 which is detected by a cam 211 of width $10^{-2}$ meters (m), and the level of liquid in the tank 22 which is detected by the position of the surface 221 of the liquid.

In the description below, the position of the shaft is designated $P_1$ and the level of the liquid is designated $P_2$. In accordance with the invention, a first step consists in defining a functional model of process monitoring (step a). In a particular implementation, this is done firstly by defining the sensors that monitor each of the physical magnitudes (step a(j)).

Thus, for the particular process shown in FIG. 2, the position of the mechanical shaft is monitored by means of sensors 212 and 213, while the level of the liquid in the tank is monitored by means of sensors 222 and 223.

Thereafter, the sensors 212, 213, 222, and 223 are associated with the state signals they deliver (step a(jj)), which signals are respectively the signals 41, 42, 43, and 44.

Figure 3A:
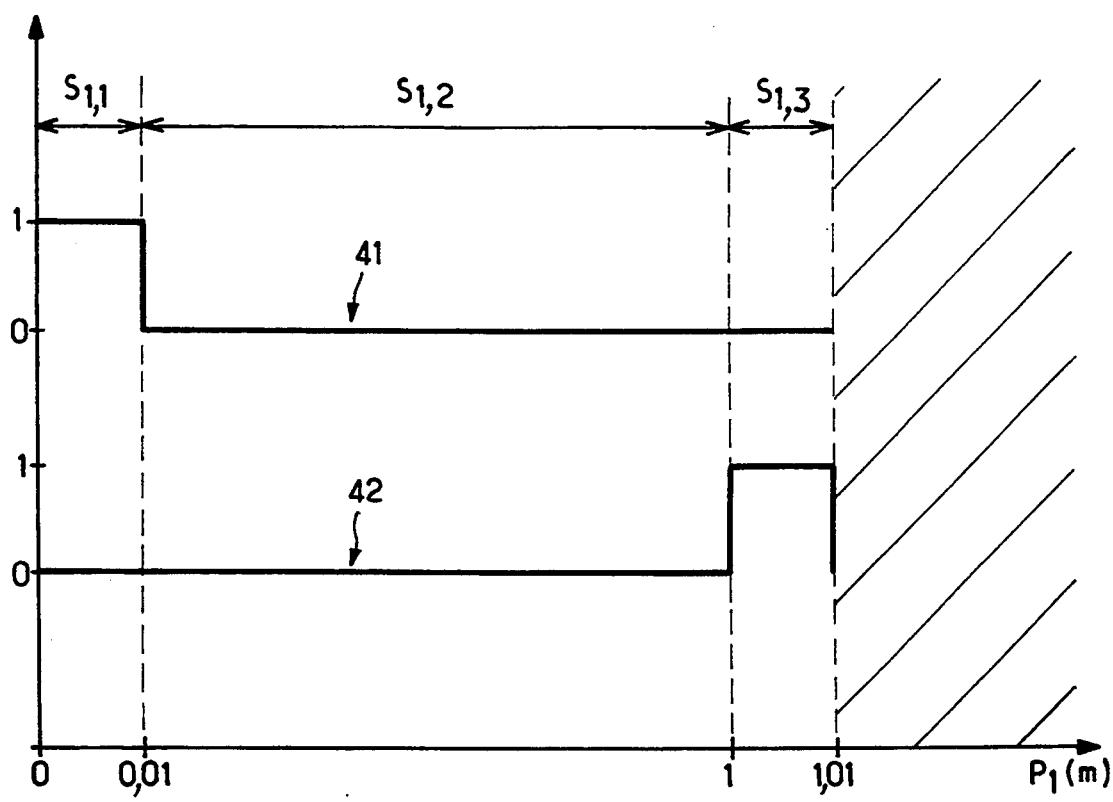
FIGS. 3a and 3b are logic state diagrams for the state signals as a function of the position of the mechanical shaft and of the level of liquid in the tank.
Figure 3B:
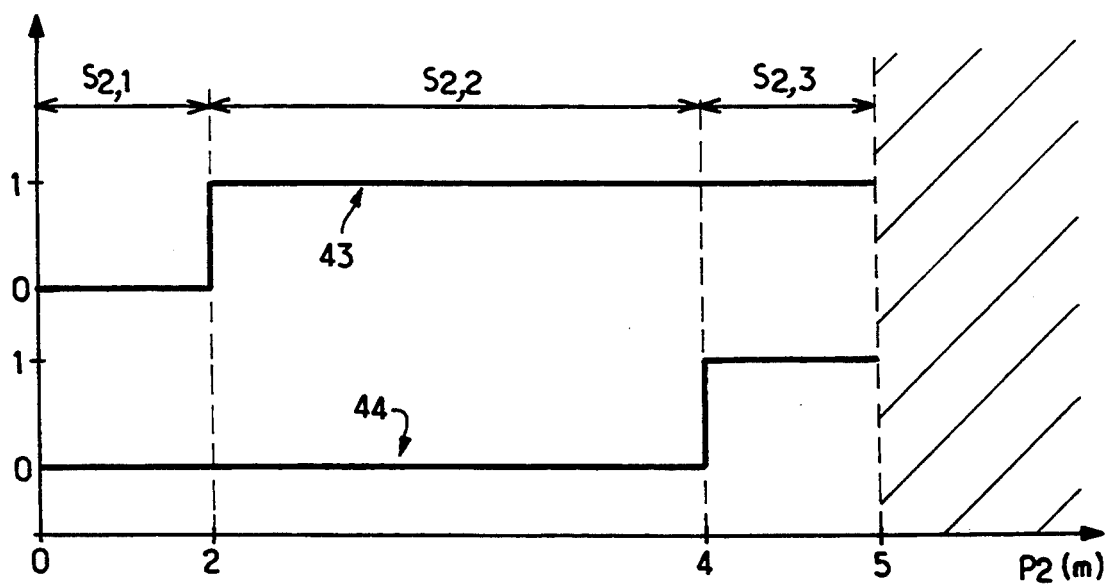

The sensors that monitor the process have fixed positions in the industrial installation. From said positions and from the width of the cam 211, it is easy to deduce the logic diagrams of FIGS. 3a and 3b which show the states respectively of the signals 41, 42 and of the signals 43, 44 as a function of the values in meters of the physical magnitudes $P_1$ and $P_2$. From the diagrams of FIG. 3a, it is easy to locate ranges over which the physical magnitude $P_1$ can vary without the sensors 212 and 213 changing state. Similarly, the diagrams of FIG. 3b show such ranges over which the physical magnitude $P_2$ can vary without the sensors 222 and 223 changing state.

Thus, the range over which the physical magnitude $P_1$ can vary is split up into a succession of contiguous sectors $S_{1,1}$, $S_{1,2}$, and $S_{1,3}$, and the range over which the physical $P_2$ can vary is split up into a succession of contiguous sectors $S_{2,1}$, $S_{2,2}$, and $S_{2,3}$ (step a(jjj)).

Thereafter, the sector $S_{1,1}$ is associated with a bottom limit which is 0, a top limit which is 0.01, the state of the sensor 212 which is 1, and the state of the sensor 213 which is 0. The same procedure is applied to each of the sectors of the physical magnitude $P_1$. Thereafter, the sector $S_{2,1}$ is associated with a bottom limit which is 0, a top limit which is 2, the state of the sensor 222 which is 0, and the state of the sensor 223 which is 0.

The same procedure is applied to each of the sectors of physical magnitude $P_2$ (step a(jjj)).

This succession of steps gives rise to a functional model of process monitoring. The model may be described in a computer file called the monitoring file:

MONITORING FILE

First physical magnitude: $P_1$
  first sensor: 212
    state signal: 41
  second sensor: 213
    state signal: 42
  first sector: $S_{1,1}$
    bottom limit: 0
    top limit: 0.01
    state:

```
                     -continued
                  MONITORING FILE first sensor: 1
                           second sensor: 0
                      second sector: S_{1,2}
                           bottom limit: 0.01
                           top limit: 1
                           state:
                                first sensor: 0
                                second sensor: 0
                      third sector: S_{1,3}
                           bottom limit: 1
                           top limit: 1.01
                           state:
                                first sensor: 0
                                second sensor: 1
              Second physical magnitude: P_2
                      first sensor: 222
                           state signal: 43
                      second sensor: 223
                           state signal: 44
                      first sector: S_{2,1}
                           bottom limit: 0
                           top limit: 2
                           state:
                                first sensor: 0
                                second sensor: 0
                      second sector: S_{2,2}
                           bottom limit: 2
                           top limit: 4
                           state:
                                first sensor: 1
                                second sensor: 0
                      third sector: S_{2,3}
                           bottom limit: 4
                           top limit: 5
                           state:
                                first sensor: 1
                                second sensor: 1
```

In the particular implementation, this file contains all of the data relating to the operation of monitoring the industrial process that is to be simulated. This data is used subsequently for simulating the way the industrial process proceeds. In an equivalent implementation, it would suffice for the functional model of process monitoring to specify for each sector only the sensors which are active (or alternatively, are inactive), with it being deduced that a sensor which is not specified for a given sector is inactive (or active as the case may be).

In a second step, a functional model of process control (step b) is defined.

With reference to FIG. 2, it can be seen that control of the industrial process 2 comprises controlling a motor 210 to drive the mechanical shaft and controlling a valve 220 to cause the tank to be filled. The motor 210 which controls the movement of the mechanical shaft 21 and which thus varies the physical magnitude $P_1$ is controlled by the automatic controller 1 by means of control signals 31 and 32. Similarly, control of valve opening to enable the tank 22 to be filled, and thus to enable the physical $P_2$ to be varied, is performed by said controller by means of control signal 33.

In a second particular implementation, the physical magnitude $P_1$ is associated with the control signals 31 and 32, and the physical magnitude $P_2$ is associated with the control signal 33 (step b(j)).

Depending on whether control signal 31 or control signal 32 is active (i.e. is in the 1 state), the motor 210 moves the mechanical shaft 21 to the right at a speed of 0.05 meters per second (m/s) or to the left at the same speed. When both signals 31 and 32 are inactive, the motor 210 is stopped, and the mechanical shaft 21 is therefore stationary. Similarly, if the signal 33 is active, then the valve 220 is open and the tank 22 fills at a speed of 1 m/s. If the signal 33 is inactive, the valve is closed and tank filling is stopped.

The following associations can thus be made:

control signal 31 with a rate of change of +0.05 m/s or 0 m/s depending on whether its state is 1 or 0;

control signal 32 with a rate of change of −0.05 m/s or 0 m/s depending on whether its state is 1 or 0; and control signal 33 with a rate of change of 1 m/s or 0 m/s depending on whether its state is 1 or 0 (step b(jj)).

The different signs for the speeds associated with the active states of the control signals 31 and 32 is explained by the fact that if control signal 31 is active, then the value of physical magnitude $P_1$ increases, whereas if control signal 32 is active, then the value of physical magnitude $P_1$ decreases. This sequence of steps gives rise to a functional model of process control. This model can be described in a computer file called the control file:

```
                    CONTROL FILE
              First physical magnitude: P_1
                   first control signal: 31
                        speed state 0: 0
                        speed state 1: +0.05 m/s
                   second control signal: 32
                        speed state 0: 0
                        speed state 1: −0.05 m/s
              Second physical magnitude: P_2
                   first control signal: 33
                        speed state 0: 0
                        speed state 1: 1 m/s
```

Once the functional models of process monitoring and of process control have been defined, it is possible to begin simulating the process in accordance with the invention.

Figure 4A:
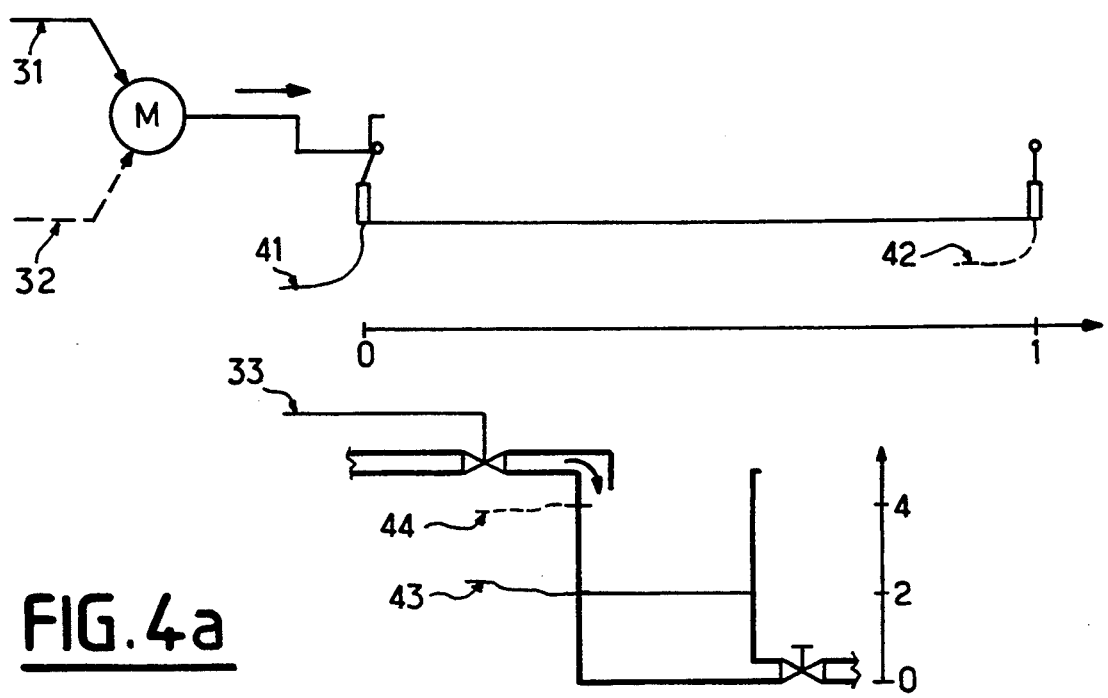
FIGS. 4a, 4b, 4c, and 4d represent the industrial process of FIG. 2 at different characteristic instants of the simulation method.

To do this, it is necessary to initialize the process whose initial state is shown in FIG. 4a. The mechanical shaft 21 is in position 0, and the tank 22 contains a liquid whose level is 2 meters, sensors 212 and 222 are in the 1 state whereas the sensors 213 and 23 are in the 0 state, and the values of physical magnitudes $P_1$ and $P_2$ are respectively 0 and 2 meters.

The states of the sensors and the values $P_1$ and $P_2$ make it possible to say that the value of the physical magnitude $P_1$ lies in the range corresponding to sector $S_{1,1}$ and that the value of the physical magnitude $P_2$ lies in the range corresponding to the sector $S_{2,2}$, where $S_{1,1}$ and $S_{2,2}$ are as defined above. A current sector $S_1$, namely the sector $S_{1,1}$ is thus defined for $P_1$ and a current sector $S_2$, namely the sector $S_{2,2}$ is thus defined for $P_2$, and the value $p_1$ of the physical magnitude $P_1$ is initialized to 0 meters while the value $p_2$ of the physical magnitude $P_2$ is initialized to 2 meters (step 2). Thus, at this stage in the simulation:

for the physical magnitude $P_1$ $p_1 = 0$ m $S_1 = S_{1,1}$ value of state signal $41 = 1$ value of state signal $42 = 0$ for the physical magnitude $P_2$ $p_2 = 2$ m $S_2 = S_{2,2}$ value of state signal $43 = 1$ value of state signal $44 = 0$ In accordance with the invention, the following step consists in calculating rates of change for each of the physical magnitudes $P_1$ and $P_2$, and denoted respectively $V_1$ and $V_2$ (step 3). This step is the first step of an iterative loop.

With reference to FIG. 4a, it can be seen that control signals 31 and 33 represented by solid line arrows are active while control signal 32 represented by a dashed line arrow is inactive. As described above in the portion of the description relating to process control, and given the states of the control signals 31, 32, and 33, it is easily deduced that $V_1$ is $+0.05$ m/s and $V_2$ is 1 m/s. To obtain $V_1$, it suffices to add the speed corresponding to the active state of control signal 31 to the speed corresponding to the inactive state of control signal 32, these speeds being specified in the control file in accordance with the second particular implementation. Similarly, $V_2$ is the speed corresponding to the active state of control signal 33.

Thereafter, the time interval $\delta t_1$ is determined for physical magnitude $P_1$ (and similarly $\delta t_2$ for $P_2$), corresponding to the time interval during which the physical magnitude $P_1$ (or $P_2$) can vary without either of the sensors 212 and 213 (or 222 and 223) changing state.

In the first particular implementation, $\delta t_1$ corresponds to the time required by the process for causing the value $p_1$ of physical magnitude $P_1$ to change so that $p_1$ becomes equal either to the top limit of the current sector $S_1$ if the rate of change $V_1$ is positive, or the bottom limit of the current sector $S_1$ if the rate of change is negative.

For $V_1$ negative: $\delta t_1 = [(\text{bottom limit of } S_1) - p_1]/V_1$ and for $V_1$ positive: $\delta t_1 = [(\text{top limit of } S_1) - p_1]/V_1$.

Given that $V_1$ is positive, that $p_1$ is 0, and that the current sector of physical magnitude $P_1$ is sector $S_{1,1}$, which has 0.01 as its top limit, $\delta t_1$ is equal to 0.2 s.

Similarly, given that $V_2$ is positive and equal to 1 m/s, that $P_2$ is 2 m, and that the current sector of $P_2$ is the sector $S_{2,2}$ which has a top limit of 4 m, $\delta t_2$ is 2 s.

Time interval $\delta t$ is then calculated, being equal to the smaller of the time intervals $\delta t_1$ and $\delta t_2$ (step 5). This gives $\delta t$ equals $\delta t_1$, i.e. 0.2 s.

Figure 4B:
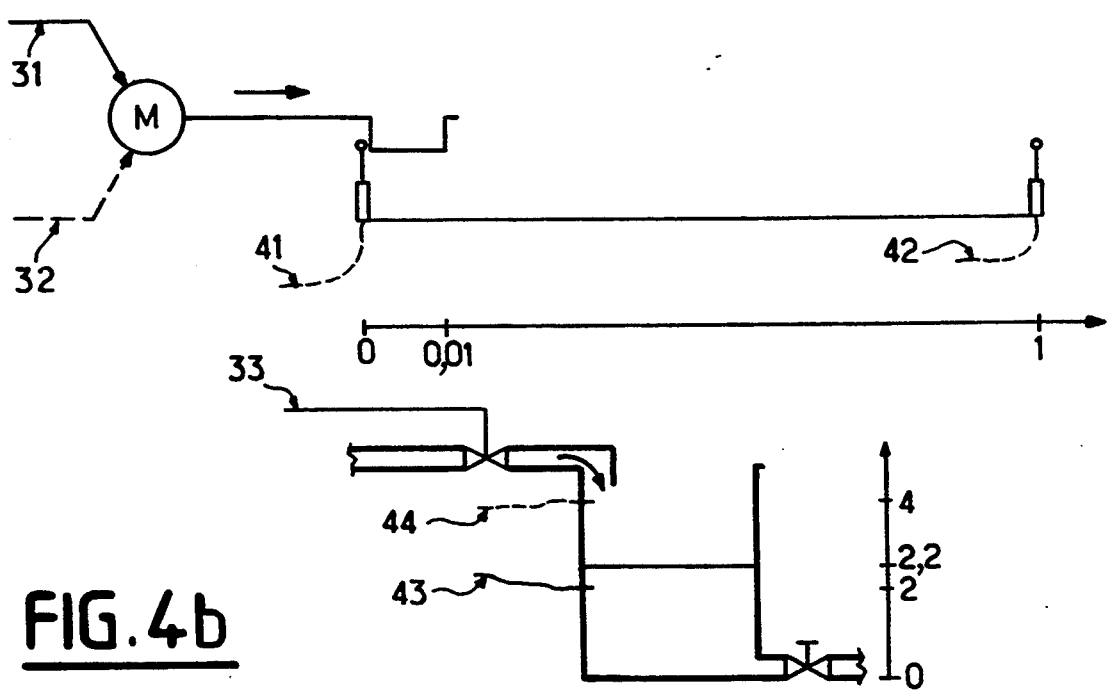

The values of the physical magnitudes $P_1$ and $P_2$ are then updated by incrementing them by the corresponding values of the products of $\delta t$ multiplied by $V_1$ and by $V_2$ (step 6). Thus after a time interval $\delta t$ equal to 0.2 s, $p_1$ which used to be 0 m becomes 0.01 m, and $p_2$ which used to be 2 m becomes 2.2 m. The new state of the industrial process is represented by FIG. 4b.

In accordance with the invention, a new current sector is calculated for physical magnitude $P_1$. This sector is automatically selected from the sectors $S_{1,1}$, $S_{1,2}$, and $S_{1,3}$ which are associated with the physical magnitude $P_1$, and the sector selected is the sector whose bottom limit or top limit is equal to $p_1$, depending on whether the rate of change $V_1$ is positive or negative. Thus, in the present case, the new current sector of $P_1$ is the sector whose bottom limit is equal to the new value of the physical magnitude $P_1$, since $V_1$ is positive. Consequently, the new current sector of $P_1$ is the sector $S_{1,2}$ (step 7).

Thus, for physical magnitude $P_1$:
$p_1 = 0.01$ m
$S_1 = S_{1,2}$
and for physical magnitude $P_2$:
$p_2 = 2.2$ m
$S_2 = S_{2,2}$.

Thereafter, it is determined whether any of the sensors 212 and 213 has a state associated with the new current sector $S_1$ that is different from its state associated with the previous current sector (step 8). In the monitoring file, it can be seen that the state of sensor 213 associated with sector $S_{1,1}$ is identical to its state associated with sector $S_{1,2}$ and is equal to 0, whereas the state of sensor 212 associated with sector $S_{1,1}$ is different from its state associated with sector $S_{1,2}$. From this it can be deduced that only the sensor changes state (becoming inactive), and the state signal 41 associated therewith in the control file is modified accordingly and now has the value 0 (step 9).

Neither of the sensors 222 and 223 changes state since the time interval $\delta t$ is less than the time interval $\delta t_2$.

At this stage in the simulation method:
for physical magnitude $P_1$:
$p_1 = 0.01$ m
$S_1 = S_{1,2}$
$V_1 = +0.05$ m/s
the value of state signal $41 = 0$
the value of state signal $42 = 0$
for physical magnitude $P_2$:
$p_2 = 2.2$ m
$S_2 = S_{2,2}$
$V_2 = +1$ m/s
the value of state signal $43 = 1$
the value of state signal $44 = 0$.

The automatic controller 1 is then informed of the change in state of state signal 41.

A pause is then provided in the simulation method by starting a time delay (step 10) so as to allow the automatic controller time to calculate whether a new control signal 31, 32, or 33 should be emitted. The value chosen for the time delay (step 1) plays an important part in the use of the simulation method for testing the operation of a controller. This choice is described below.

When the time delay comes to its end (generally after a few tens of milliseconds), the first iteration has come to an end, and the method as described above is repeated starting by calculating the rates of change $V_1$ and $V_2$. This corresponds to the first step of the above-mentioned iterative loop.

Figure 4C:
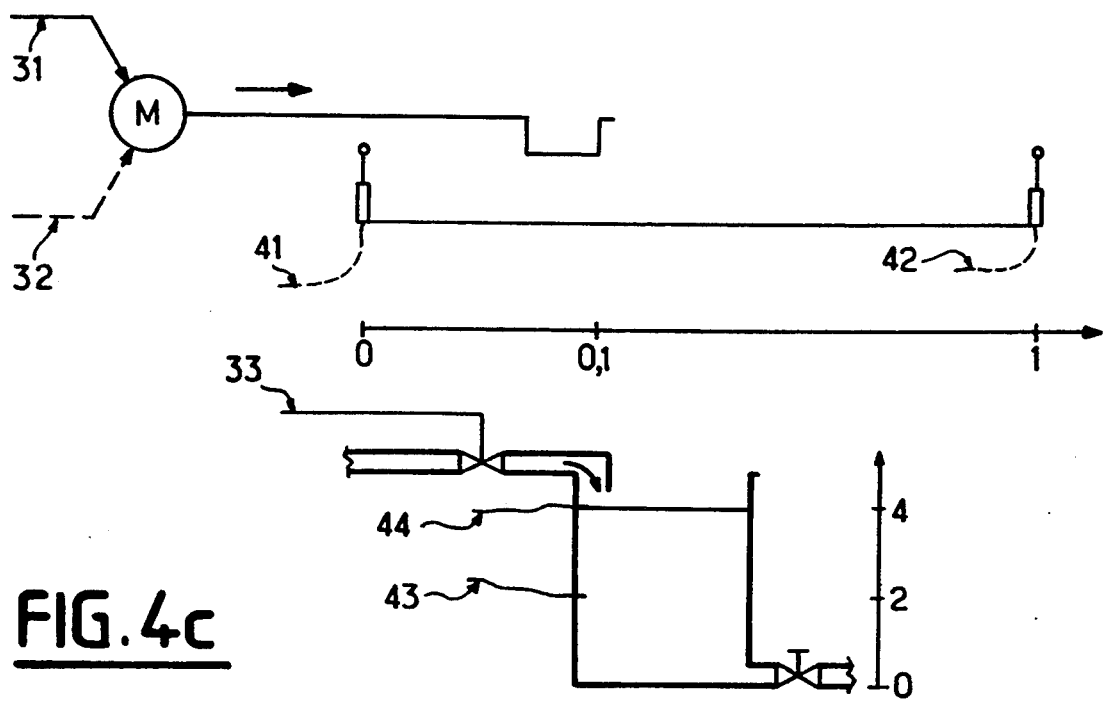
Figure 4D:
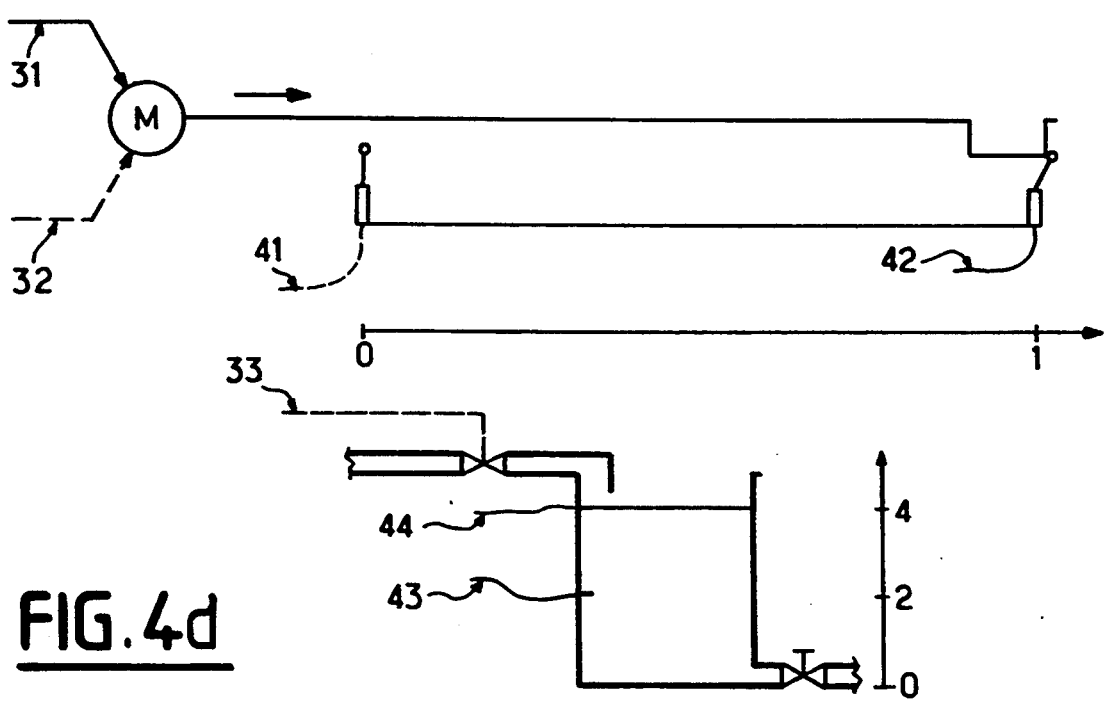

FIGS. 4c and 4d show how the process has proceeded after a second iteration and a third iteration. At the second iteration, it can be seen in FIG. 4c that the control signals 31, 32, and 33 have not changed state. The following still applies:

$V_1 = +0.05$ m/s and $V_2 = +1$ m/s

By applying the simulation process as described above, the following are obtained:

$\delta t_1 = 19.8$ s; $\delta t_2 = 1.8$ s; $\delta t = \delta t_2$ 1.8 s and the following new values are deduced for $P_1$ and $P_2$:

$p_1 = 0.01$ m; $p_2 = 4$ m

Only sensor 223 changes state and becomes active. The values of state signals 41, 42, and 43 therefore remain unchanged. State signal 44 is in the active state.

With reference now to FIG. 4d, it can be seen the automatic controller responds to the change in state of the signal 44 by changing the value of the control signal 33 which is deactivated, thereby stopping filling of the tank 22 by closing the valve 220.

The third iteration of the simulation method thus leads to causing the industrial process to proceed to a new state as shown in FIG. 4d. The time interval δt corresponding to this new iteration is equal to 1.8 s.

Thus, by successive iterations, it is possible to simulate the entire industrial process as a function of the control signals 3 emitted by the automatic controller 1.

The advantage of such a simulation method is that it provides accelerated simulation of the process, not real time simulation, while nevertheless keeping track of real time by means of the value of time interval δt on each iteration.

The two particular embodiments of the functional models for process control and for process monitoring make it possible to implement the process automatically. Any other method of modelling control and monitoring of the process for achieving the same results, in particular by enabling the time interval δt to be calculated automatically, would not go beyond the ambit of the invention.

In addition, particular embodiments of the simulation method can easily be implemented by computer means such as a personal microcomputer connected to the automatic controller. Furthermore, such computer means may advantageously also be suitable for simulating the operating logic of the automatic process controller.

Another important characteristic of the method of the invention is choosing a value for the time delay that is referred to below as the waiting time. The purpose of the following description is to show an application of the method to validating the operation of an automatic controller which may be implemented as hard-wired logic or as programmed logic, by making use of the above-mentioned characteristic.

It is assumed that the automatic controller 1 is an industrial programmable controller whose program is designed so that as a function of the state signals 41, 42, 43, and 44, it calculates control signals 31, 32, and 33. It is of interest to make a detailed list of the events that take place if the industrial process is simulated relative to the controller using a waiting time that is less than one full cycle of the controller. If the above-described simulation method is applied with zero waiting time, then the first two iterations remain unchanged since the control signals 31, 32, and 33 do not change. In contrast, on the third iteration, because of the zero waiting time, the controller does not have the time to deactivate the control signal 33 for the purpose of stopping tank filling. From this it can be concluded that $p_2$ is no longer equal to 4 m at the end of the third iteration, but is equal to 22 m, since the tank continues to fill at a rate of 1 m/s. This characteristic of the simulation method means that a waiting time should be specified whose value when used with an automatic controller in the form of an industrial programmable controller is not less than one cycle of the controller. During such a cycle, the controller reads all of its inputs, i.e. it takes account of the state signals 4, after which it calculates its outputs on the basis of its inputs and on the basis of internal bits, and finally it refreshes the state of its outputs, which corresponds to emitting the control signals 3. At least one cycle is thus necessary to enable the controller to take account of the most recent change in state signal 44 so as to update control signal 33 that stops the tank being filled.

Thus, to test the operation of an industrial programmable controller, the industrial process 2 that it controls is initially simulated (step A) with a waiting time that is greater than the controller's cycle time. For example, a waiting time is chosen that is equal to five times the cycle time of the controller.

Thus, in the above case, the controller has sufficient time on the third iteration to calculate a new control signal 33. By analyzing the control signals emitted by the controller on each successive iteration, the logical sequencing of said signals is validated.

Once such validation has been performed, overall simulation of the process is repeated several times in a second period (step B) but using smaller and smaller waiting times, until a difference is observed in the sequencing of the control signals. Thus, for tank filling, such divergence appears when the control signal 33 is no longer deactivated in time. It is then possible to determine a minimum waiting time that corresponds to the maximum calculation time of the controller.

This minimum waiting time naturally depends on the controller and on its cycle time, and it also depends on the structure of the program, in particular on the way internal bits are handled for use in intermediate calculations. From the above description, it can be seen that the minimum waiting time is at best one cycle of the controller.

In certain industrial applications, this information on the real calculation time of the controller may be of major importance, either with respect to safety, or with respect to the accuracy of the industrial process implemented.

The particular application of this use of the simulation method for testing the operation of a programmable controller is given as an example. The method may also be used to validate the operation of any automatic controller, by selecting an initial value for the waiting time in step A that is greater than the estimated execution time of the automatic controller.

It can thus be seen that the simulation method and use thereof in accordance with the invention can be applied to the important step in the automation of industrial installations that consists in certifying that the automatic controller complies with the specifications of the installation. Thus, they can be used initially to validate the logical operation of the automatic controller before the industrial process is implemented, and secondly to quantify the execution time of the controller; thus making it possible to certify compliance with certain timing constraints associated with a given industrial installation.

We claim:

1. A simulation method for testing an automatic controller by simulating an industrial process, that is intended to be controlled by said automatic controller via control signals and state signals respectively emitted and received by the automatic controller, that causes the value of each physical magnitude characteristic of the state thereof to vary as a function of the state of said control signals, and that reports its state to said controller by means of said state signals emitted by sensors as a function of the values of the respective physical magnitudes that they monitor, the method being implemented in a simulator whose inputs and outputs are connected respectively with the inputs and outputs of the controller, via the control signals and state signals, wherein the method comprises the following steps:

a) defining in the simulator a functional model of process monitoring for the industrial process with the state signals representatives of the physical magnitudes;

b) defining a functional model of process control for the industrial process;

c) initializing the state signals of the industrial process;

d) calculating upon the state signals for each physical magnitude $P_i$, a rate of change $V_i$ which is a function of the state of the control signals emitted by the controller;

e) determining for each physical magnitude $P_i$ whose rate of change is not zero, a time interval $\delta t_i$ during which the value of the physical magnitude can vary without any of the sensors monitoring said magnitude $P_i$ changing state;

f) calculating the time interval $\delta t$ which is defined as the shortest of the time intervals $\delta t_i$ determined in the preceding step;

g) updating the value of each of the physical magnitudes $P_i$, by incrementing each of them with the value of the product of the time interval $\delta t$ multiplied by the corresponding rate of change $V_i$;

h) determining, as a function of the values of the physical magnitudes updated in the preceding step, which sensors change state, and updating for the controller the corresponding state signals; and i) waiting for a time lapse referred to as the waiting time, the value of which is parameterizable, prior to repeating the method from step d).

2. A method according to claim 1, wherein step a) is split up into the following sequence of steps:

j) defining which sensors monitor each physical magnitude;

jj) associating each sensor with a state signal;

jjj) splitting up the range over which each physical magnitude $P_i$ can vary into a succession of contiguous sectors, each sector $S_{i,j}$ corresponding to a range of the physical magnitude $P_i$ during which none of the sensors monitoring the magnitude $P_i$ changes state; and jjjj) associating each of the sectors $S_{i,j}$ with a bottom limit and a top limit, and also with the corresponding states of the sensors monitoring the magnitude $P_i$.

3. A method according to claim 2, wherein step b) is split up into the following sequence of steps:

j) associating each physical magnitude $P_i$ with the control signals that cause the value of the magnitude $P_i$ to vary;

jj) associating each of the control signals defined in j) with a rate of change for the magnitude $P_i$ as a function of the binary state of said control signal.

4. A method according to claim 3, wherein steps c) to i) are performed automatically using the following sequence of steps:

1) selecting a value for the waiting time;

2) selecting for each physical magnitude $P_i$ a current sector $S_i$ selected from the sectors that make up the range of variation in the magnitude $P_i$, and initializing a value $p_i$ lying within the limits of the current sector $S_i$;

3) calculating the rate of change $V_i$ for each physical magnitude $P_i$ on the basis of the rates of change associated in step b(jj) with each control signal as a function of its state;

4) determining, for each physical magnitude $P_i$, the time interval $\delta t_i$ as a function of the limits of the current sector $S_i$, of the rate of change $V_i$, and of the value $p_i$ of the physical magnitude;

5) calculating $\delta t$ in compliance with step f);

6) updating the value of each physical magnitude $P_i$ in compliance with step g);

7) calculating for each physical magnitude for which a time interval $\delta t_i$ equal to $\delta t$ has been determined, a new current sector as a function of the sign of the corresponding rate of change $V_i$;

8) determining which sensors monitoring a physical magnitude $P_i$ for which a new current sector was calculated in the preceding step, has a state in the new current sector that is different from the state it had in the preceding current sector;

9) updating the state signals corresponding to the sensors whose states are calculated as changing in the preceding step; and 10) starting a time delay whose initial value corresponds to the waiting time selected in step 1), and waiting until the end of said time delay before automatically restarting the method at step 3).

5. A method according to claim 1, for testing the operation of an automatic controller controlling an industrial process, wherein the following steps are implemented:

A) initially simulating the entire industrial process with a waiting time that is greater than the estimated execution time of the automatic controller so as to validate the logical sequencing of the control signals emitted by said controller; and B) reiterating the simulation with smaller and smaller waiting times until a minimum waiting time is reached for which the automatic controller still sequences the control signals correctly.

6. A method according to claim 5, applied to an automatic controller constituted by an industrial programmable controller, wherein the waiting time of step A) is selected in such a manner as to be greater than the cycle time of the controller.

* * * * *

UNITED STATES PATENT AND TRADEMARK OFFICE
CERTIFICATE OF CORRECTION

PATENT NO. : 5,436,855
DATED : July 25, 1995
INVENTOR(S) : Didier WILLAEYS et al It is certified that error appears in the above—identified patent and that said Letters Patent is hereby corrected as shown below:

Title page, Section [75]    correct spelling of first inventor's name to "Didier WILLAEYS".

Signed and Sealed this

Sixteenth Day of January, 1996

Attest:

BRUCE LEHMAN

Attesting Officer    Commissioner of Patents and Trademarks